United States Patent
Schibuk

(10) Patent No.: US 8,667,269 B2
(45) Date of Patent: Mar. 4, 2014

(54) EFFICIENT, SECURE, CLOUD-BASED IDENTITY SERVICES

(75) Inventor: Norman Schibuk, Merrick, NY (US)

(73) Assignee: SurIDx, Inc., Wellesley, MA (US)

( * ) Notice: Subject to any disclaimer, the term of this patent is extended or adjusted under 35 U.S.C. 154(b) by 170 days.

(21) Appl. No.: 13/079,174

(22) Filed: Apr. 4, 2011

(65) Prior Publication Data

US 2011/0246765 A1    Oct. 6, 2011

Related U.S. Application Data

(60) Provisional application No. 61/320,606, filed on Apr. 2, 2010.

(51) Int. Cl.
*H04L 29/06* (2006.01)

(52) U.S. Cl.
USPC ............................................. 713/156; 726/10

(58) Field of Classification Search
USPC ........................................... 713/156; 726/10
See application file for complete search history.

(56) References Cited

U.S. PATENT DOCUMENTS

| 6,233,577 B1 * | 5/2001 | Ramasubramani et al. ......... 1/1 |
| 2003/0204741 A1 * | 10/2003 | Schoen et al. ................. 713/200 |

* cited by examiner

*Primary Examiner* — Yogesh Paliwal
(74) *Attorney, Agent, or Firm* — Sunstein Kann Murphy & Timbers LLP

(57) ABSTRACT

An Identity Ecosystem Cloud (IEC) provides global, scalable, cloud-based, cryptographic identity services as an identity assurance mechanism for other services, such as data storage, web services, and electronic commerce engines. The IEC complements these other services by providing enhanced identity protection and authentication. An IEC performs identity services using surrogate digital certificates having encryption keys that are never exposed to the public. An individual requesting other services must meet an identity challenge before access to these other services is granted. Service requests to the IEC, and responses from the IEC, are securely encrypted. An IEC integrates smoothly into existing services by layering on top of, or being used in conjunction with, existing security measures. Identity transactions may be logged in a manner that complies with strict medical and financial privacy laws.

16 Claims, 9 Drawing Sheets

EFFICIENT, SECURE, CLOUD-BASED IDENTITY SERVICES

CROSS-REFERENCE TO RELATED APPLICATIONS

This application claims the benefit of U.S. Provisional Application No. 61/320,606, filed Apr. 2, 2010, the contents of which are incorporated herein by reference in their entirety.

TECHNICAL FIELD

The present invention relates to cloud computing, and more particularly to providing secure, distributed, cryptographic identity services in support of electronic data transactions that require authentication of individuals.

BACKGROUND ART

Computer systems today are insecure. They suffer from a multitude of security problems, including system cracking, system disruption, and malicious impersonation of users. Some malicious persons ("system crackers") break into systems, bypassing or cracking their security mechanisms. These system crackers can gain access to secure data and systems, change or corrupt important data, change or corrupt the security systems themselves to install back doors or permit physical access to restricted premises, or commit any number of secondary crimes using their unauthorized access to sensitive data. Other malicious persons can disrupt system function, for example committing denial-of-service (DoS) attacks by flooding a computer system with an overwhelming torrent of unwanted and disrupting data, thereby changing or delaying the way a system responds. Such DoS attacks may disrupt important aviation, public transportation, and emergency response systems, leaving our key infrastructure systems vulnerable. Other malicious persons may impersonate doctors, lawyers, law enforcement, or other trusted personnel to gain access to restricted data and services. For example, a false identity may allow a malicious person having weapons to gain access to the sterile area at an airport, and board an airplane.

Several solutions to these security problems exist in the art, and include: login names and passwords; firewalls to exclude unauthorized access to computer systems; one-time passwords for isolated transactions; smartcards, such as those compliant with HSPD-12 and FIPS 201; access control lists; and virtual private computer networks, among others. One such solution in the prior art is shown in FIG. 1. Here, a requester 100 wishes to gain access to data and services 130, represented in the figure by a "processing cloud" that may be a single server computer or a network of computing resources. The requester 100 has access to a requester device 110. Typically, the requester 100 will login to the requester device 110 using a user name and password, as noted above. Next, requester 100 will direct a software application running on requester device 110 to attempt to contact service 130 using a computer network (not shown). Requester device 110 will normally look up an Internet address associated with a name provided for the service, such as www.google.com, using a database service such as the Domain Name Service (DNS), as is known in the art. Requester device 110 then attempts to contact service 130 using the Internet address. Conversely, service 130 routes all such incoming requests through a firewall 120. The firewall provides security services, such as prevention of DoS attacks, authorization and authentication challenges to access the service 130, port forwarding, virus scanning, and so on. If the firewall 120 determines that the attempted access is legitimate, then it provides requester device 110 a data channel that permits access to service 130. Typically, firewall 120 maintains this data channel, but does not otherwise monitor the data that pass through it. This data channel may be encrypted by both the requester device 110 and the service 130, using techniques known in the art such as SSL. Once the transaction is complete, the data channel is "torn down" to free up processing resources on requester device 110, firewall 120, and service 130.

Such prior art security measures generally establish system protection once, at the perimeter of the system being secured, not within the system itself. They are concerned with protecting access to the secure computing resources, such as the communications channels, rather than protecting the data that is transmitted to and from these resources—once a malicious person has gained access, they may remove sensitive data without further challenge. Further, the access restrictions of the prior art are performed before, or as part of, any determination of the identity of the person requesting the access. Thus, they suffer from impersonation attacks and man-in-the-middle (MitM) attacks. Even worse, in systems that perform encryption and decryption operations, these operations must be conducted by and on "thin" client devices, such as smart phones, that do not have a great deal of computing power in the first instance. The systems in the art for distributing encryption and decryption keys to the millions of such devices are cumbersome, expensive, and do not scale well.

End user systems, even those that use encryption, cannot be fully trusted in a secure environment due to the threat of compromise. Once system security is cracked by a malicious user ("system cracker"), the system cracker can masquerade as a legitimate user by accessing the data and algorithms stored in and used by the system. These "artifacts" of the identity processes, present on all end user systems that perform secure transactions, provide an unwanted attack vector against transaction systems that rely on verified identities, decreasing the security and reliability guarantees offered by these systems.

SUMMARY OF THE INVENTION

These problems, and others, may be solved by isolating identity query and response services, their cryptologic support functions, and pathing in an Identity Ecosystem Cloud (IEC), as shown and described herein. An Identity Ecosystem Cloud provides relying systems with a single, highly-secure source for trusted identity services. These identity services include, without limitation: identity validation, identity data backup and recovery, encryption and decryption services, digital certificate trust path validation, and certificate cross-validation, although persons skilled in the art may employ other identity services to suit a particular application. Security is maintained using a number of different design and implementation criteria.

An IEC is an entity separate from other cloud-based services, such as data storage, web services, electronic commerce, and so on. The IEC is meant to act as a complement to these other services, by providing enhanced identity protection and authentication, in order that these other services may permit or deny access based on an assurance of identity. Thus, the IEC increases the security of these other systems. Because identity functions are performed inside the secure environment of the Identity Ecosystem Cloud, it is a simple matter to, for example, validate digital certificate trust chains, and solve other logistical challenges that have plagued the widespread deployment of PKI systems.

From the perspective of an outside user, embodiments of the invention provide strict isolation between identity services, and those for whom the services are performed. From the perspective of the secure system implementer, information linking stored identity data and its corresponding user is only available to those possessing physical access to the system, and not to any person who accesses the system using a public computer network. Thus, the system is impervious to compromise by remote system crackers. From either perspective, it becomes impossible to compromise communication between a sender and a recipient through a man-in-the-middle cryptologic attack, because the encryption keys of both the sender and the recipient are never exposed on widely-accessible networks (such as the Internet, or even a corporate LAN).

In a first embodiment of the invention there is provided a computing system for providing a plurality of cryptographic identity services on behalf of a relying system. The system includes a storage arrangement that stores surrogate certificates. Surrogate certificates are defined below, and in particular are not retrievable by any user of the computing system, although users may direct the computing system to use the surrogate certificates. The surrogate certificates are indexed by certificate identifier in the storage arrangement. The computing system further includes a distributed computing environment, such as a cloud computing environment, that is coupled to the storage arrangement and to a public data communication network. The distributed computing environment includes computing devices configured to cooperatively perform the plurality of cryptographic identity services using the stored surrogate certificates. Typically, these devices perform the identity services in response to receipt of a message, but in any event the computing devices are configured to preclude performing any identity service unless pursuant to a request, received via the public data communication network, that includes a surrogate certificate identifier pertinent thereto.

In related embodiments, the computing system further includes inbound or outbound firewalls, or both together, for providing secure access to the relying system. Thus, the computing system may also include an inbound computer gateway in communication with the distributed computing environment via a private data communication network. The inbound computer gateway is configured to both intercept requests, made by an individual to the relying system, whose execution requires one or more of the plurality of cryptographic identity services to be performed. The inbound computer gateway is also configured to challenge the identity of the individual, using information stored in a surrogate certificate associated with the individual, so that the individual is prevented from accessing the relying system unless the identity challenge is successfully met. Thus, the inbound computer gateway acts as an additional layer of security on top of any existing firewall that the relying system might include.

Also, or in the alternative, the computing system may include an outbound computer gateway in communication with the distributed computing environment via a private data communication network. The outbound computer gateway is configured to intercept a message sent on behalf of the relying system to a recipient before it is delivered to the recipient, retrieve a matched key of the recipient from the storage arrangement, encrypt the message using the matched key, and transmit the encrypted message to the recipient instead of the intercepted message. Further, the computing system may include a certificate authority, coupled to the storage arrangement, the certificate authority being configured to generate surrogate certificates and store them in the storage arrangement.

In a second embodiment of the invention there is provided a computerized method of providing a cryptographic identity service to an individual. The method includes receiving, at a server system (such as the computing system described above), an electronic message containing a request for the cryptographic identity service from the individual. The message is received over a data communication network, and includes a surrogate certificate identifier specific to the individual. The surrogate certificate identifier identifies a specific surrogate certificate having encryption data. The method further includes retrieving the specific surrogate certificate from a storage arrangement that is part of the server system by using the received surrogate certificate identifier specific to the individual. As before, the storage arrangement stores surrogate certificates that are indexed by certificate identifier. Because surrogate certificates are meant to be kept within the computing system, the storage arrangement stores surrogate certificates without retrievabilty by any user. The principal method concludes by performing the requested identity service in a computer process using the encryption data in the retrieved surrogate certificate. The server system is configured, as before, to preclude performing any identity service unless pursuant to a request including a surrogate certificate identifier pertinent thereto.

The cryptographic identity service may be, among other things: identity data validation; identity data backup; identity data recovery; determining the revocation status of a digital certificate; validating a trust path of a digital certificate; cross-validating a digital certificate; encrypting or decrypting data for a recipient using a surrogate certificate; storing, updating, or querying an individual's personally identifiable information; and storing or retrieving a public key.

Many variations on this method are contemplated. For example, additional security precautions may be enforced. In a related embodiment, the surrogate certificate identifier is constructed by applying a one-way hash function to data, accessible only by the individual, that is associated with the surrogate certificate. In this way, only the individual is able to generate the surrogate certificate identifier. In a further embodiment, the data used for this process are stored in a device that may be operated only by the individual after the individual is authenticated to the device. In a separate embodiment, to provide additional security the surrogate certificate and the request both include challenge data pertaining to a biometric of the individual, a password known only to the individual, or data contained in a cryptographic token possessed by the individual. In this embodiment, the method includes performing the requested identity service only when the challenge data in the request matches the challenge data in the surrogate certificate.

For added security, in some embodiments the encryption data are created on behalf of the individual by a computer system, operated by a certificate authority, that is not accessible by the individual. In such embodiments, the method may include receiving a message revoking the surrogate certificate of the individual, from the certificate authority, thereby preventing the individual from further obtaining identity services.

The methods described herein permit identity services relating to multiple parties. Thus, in one method embodiment, performing the requested identity service includes using the encryption data in the surrogate certificate to decrypt personally identifiable information of a second individual. The surrogate certificate may be prevented from decrypting the personally identifiable information unless the second individual had previously granted permission for said decrypting to a class of people that includes the individual. The method may be extended by, for example, transmitting to the individual the personally identifiable information of the second individual, or the answer to a yes-or-no question pertaining to the personally identifiable information of the second individual, without revealing said personally identifiable information. Such extended methods are useful for such matters as verifying the age of a would-be purchaser of alcohol, without exposing any private information of the purchaser other than his age. The method may also be extended by digitally signing information pertaining to the request and appending the digitally signed information to a transaction log. In this way, the computing system may maintain comprehensive records of all identity services requested, and which requester has been given which private information of another. Such logs may be used to create, for example, audit trails of all parties that have obtained, with respect to a given individual, medical records, social security numbers, bank account numbers, and the like. These audit trails may then be used to demonstrate compliance with various privacy laws.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
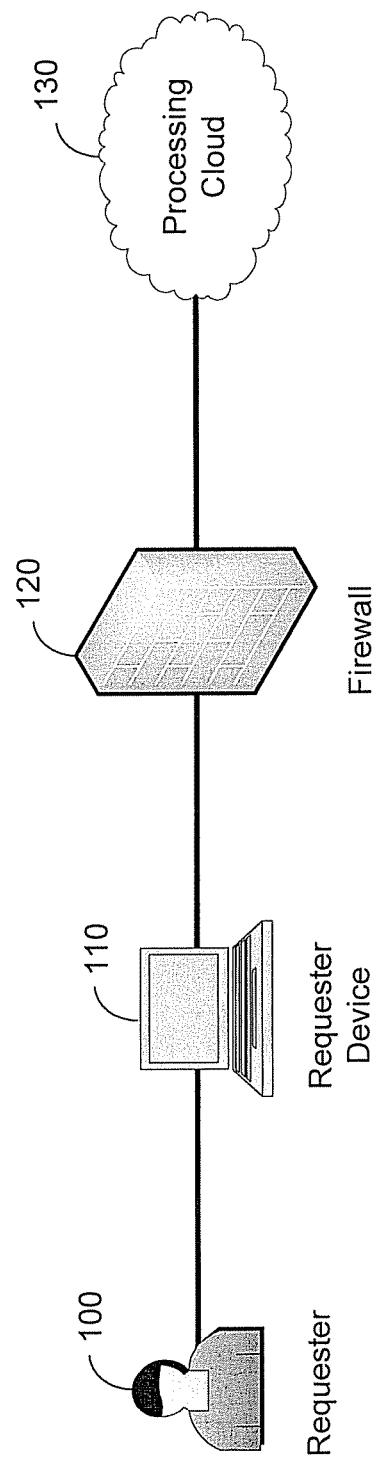
FIG. 1 is a schematic depiction of a prior art system permitting an individual to obtain access to a computing resource.

Definitions. As used in this description and the accompanying claims, the following terms shall have the meanings indicated, unless the context otherwise requires:

A cloud is a computing environment in which computing resources, such as processing capacity, memory, non-volatile storage, and network connectivity are distributed among a number of different processing centers. Computing clouds perform computing services, such as data archiving, electronic commerce, large-scale collaborative computations and the like on behalf of requesters. Clouds abstract the details of how those services are performed from end users who may require them. Clouds are often implemented using an interconnected network of computers, as is known in the art of scalable computing. Various embodiments of the present invention use an Identity Ecosystem Cloud (IEC), as that phrase is described herein.

A matched key is an "encryption key," as that phrase is understood in the prior art of asymmetric encryption, that is not accessible to the general public through a public key infrastructure (PKI). Without further context, the phrase "matched key" denotes a "public key," as that phrase is understood in the art. Thus, a message encrypted using an individual's matched key may be decrypted using the individual's private key, and a digital signature created using the individual's private key may be verified using the matched key. The phrase "matched key" is used in the description below in order to expressly distinguish encryption keys in an IEC that are "matched" to an individual but never exposed to the public, from a traditional PKI in which public encryption keys are available, by design, to members of the public through the use of certificate authorities.

A surrogate certificate is a digital certificate, created using techniques known in the art of digital certificates, that is used to store one or more matched keys in an Identity Ecosystem Cloud (IEC), as that phrase is used herein. Cryptographic operations using surrogate certificates are accessible to individuals requesting identity services, but the data within the surrogate certificates are never exposed outside the IEC. In particular, an individual or other party who requests cryptographic identity services from the IEC does not have, and cannot obtain, direct knowledge of any matched key, including his own, or retrieve any other encryption data stored in a surrogate certificate.

Secret sharing is a prior art process in which a full secret is broken into a number of partial secrets that are shared between a number of individuals (say, n people), whereby a threshold number of those individuals (say, t people, where t<n) may combine their partial secrets to obtain the full secret. The full secret may then be used, for example, to decrypt a document on behalf of the t individuals. One prior art method for sharing secrets operates by creating a polynomial of degree t−1, whose coefficients form the full secret; sampling values of the polynomial at n different places; and distributing one sample to each of the n individuals. A simple curve fitting equation reconstructs the complete polynomial (hence, the full secret) from any t such sampled points. The term secret sharing, as used herein, is contemplated to encompass any system that employs partial secrets, not only the exemplary system just described.

In accordance with various embodiments of the invention disclosed herein, an Identity Ecosystem Cloud (IEC) is disclosed herein that provides global, scalable, cloud-based identity services. An IEC is an entity separate from other cloud-based services, such as data storage, web services, electronic commerce, and so on. The IEC is meant to act as a complement to these other services, by providing enhanced identity protection and authentication, in order that these other services may permit or deny access based on an assurance of identity. Thus, the IEC increases the security of these other systems. Because identity functions are performed inside the secure environment of the Identity Ecosystem Cloud, it is a simple matter to, for example, validate digital certificate trust chains, and solve other logistical challenges that have plagued the widespread deployment of PKI systems.

Construction of an IEC

Physically, an IEC is a secure, distributed computing environment that performs identity services under a common administrative control. The common control design permits the cloud to include only such hardware and software is necessary to perform the identity services described in more detail below, thereby enhancing overall system security. Such hardware and software may be provided as an integrated unit, or through the addition of modules vetted by the IEC operator. Thus, an IEC behaves, in one aspect, like a scalable smartcard or other dedicated encryption system. In another aspect, an IEC acts as a proxy for a large number of certificate authorities, providing a scalable encryption key storage and management system that is similar to a public key infrastructure (PKI). Viewing these aspects together, an IEC provides the security advantages of public key cryptography, but within a closed system that is nearly impervious to the vulnerabilities that occur in widely-exposed, general-purpose computer systems that also provide non-identity services.

Figure 2:
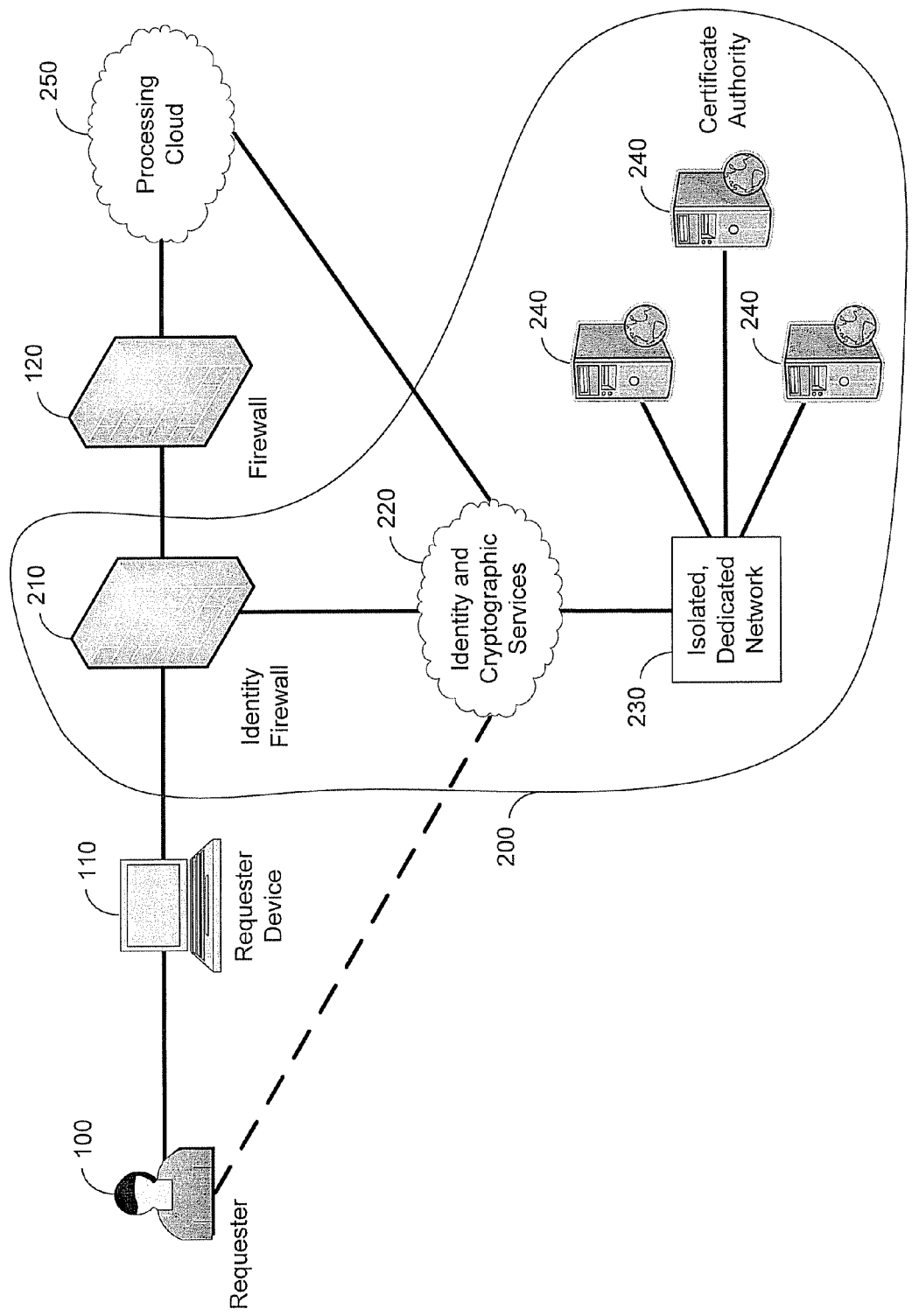
FIG. 2 is a schematic depiction of a system in accordance with an embodiment of the invention, wherein an individual is authenticated to a computing resource using an Identity Ecosystem Cloud.

An exemplary Identity Ecosystem Cloud is shown in FIG. 2, which represents an improvement over the prior art system of FIG. 1. Referring to FIG. 2, a requester 100 possesses a requester device 110 and seeks access to computing resources. As in FIG. 1, a firewall 120 protects the computing resources. However, in accordance with an embodiment of the present invention, IEC 200 has been added. In this embodiment, IEC 200 includes an Identity Firewall 210—a computer gateway that performs identity authentication, and prevents the requester device 110 from accessing the firewall 120 until the requester 100 satisfies an appropriate identity challenge. Identity Firewall 210 performs this function by accessing identity and cryptographic services in a Services Cloud 220. Services Cloud 220 contains encryption keys and other data required to enable the Identity Firewall 210 to perform and validate the identity challenge. These encryption keys and other data are initialized by the requester 100 during initialization of the system (as indicated by the dashed line and described in more detail below), and retrieved at the time of a request for computing services by any requester that claims to be requester 100. These data are obtained by communicating over an isolated, dedicated computer data network 230 with one or more certificate authorities 240. The network 230 is isolated from requester 100 (and the processing cloud 250 that performs the service requested by requester 100), in order to provide additional security, as described in more detail below. Processing cloud 250 may also communicate with IEC 200 as part of the additional security process using a data communication link (such as the Internet, LAN, or any other link known in the art of data communications), as indicated. Various use cases requiring such communication are separately explained below.

Identity Firewall 210 may be physically embodied using hardware such as routers, gateways, and computer servers, as is known in the art. The identity authentication processes themselves may be accomplished using dedicated hardware or software that operates in accordance with the exemplary embodiments described herein, or with obvious variants thereof. Similarly, Services Cloud 220 may be implemented as one or more computer servers that provide identity authentication and encryption services to requester 100, Identity Firewall 210, and processing cloud 250, or as a combination of hardware and software. However, the services provided by the IEC 200 may be restricted to those services directly pertaining to providing identity authentication, so special purpose computing environments that have severely limited but dedicated processing functions may be used, including embedded computing systems (as that phrase is known in the art).

Figure 3:
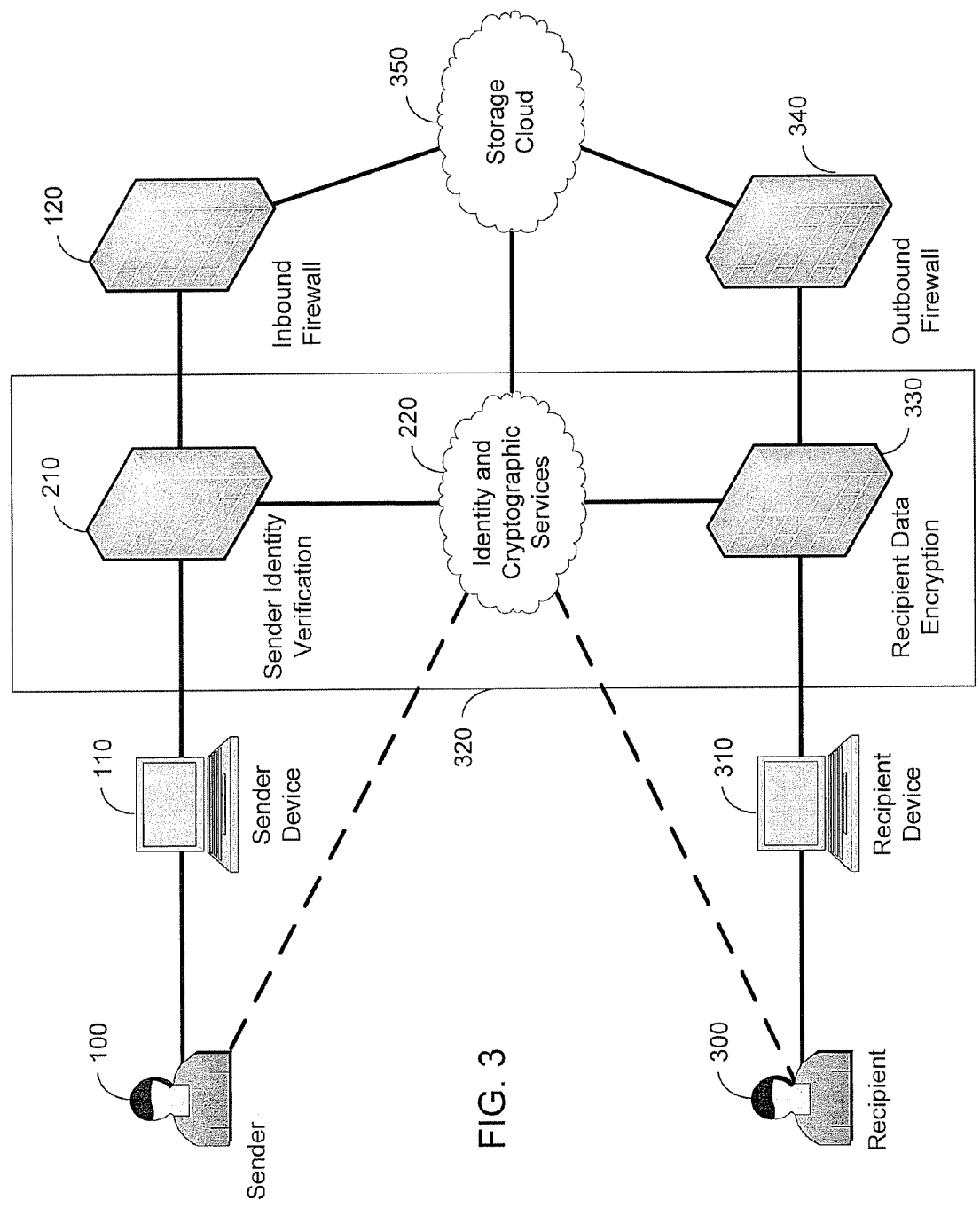
FIG. 3 is a schematic depiction of a system in accordance with another embodiment of the invention that permits a sender to securely send a message to a recipient.

A second exemplary IEC is shown in FIG. 3, which depicts an embodiment in which a sender 100 uses sender device 110 to store a message for later retrieval by recipient 300 using recipient computer 310. In accordance with this embodiment, sender 100 creates the message and stores it in storage cloud 350 in an encrypted manner such that only recipient 300 can decrypt it by accessing outbound firewall 340. Here, IEC 320 includes not just Identity Firewall 210 and Services Cloud 220, but a gateway 330 that requests encryption of all outbound data based on its intended recipient. Such a gateway may be implemented using the functions described in U.S. provisional patent application 61/177,539, entitled "Systems and Methods for Facilitating Secure Communication Using Public Key Encryption," the contents of which are hereby incorporated by reference in their entirety. In particular, in accordance with embodiments of the present invention, gateway 330 may encrypt outbound data using an encryption key of recipient 300 that is not exposed to any public network (i.e. a matched key, as that term is defined herein). This key is obtained from Services Cloud 220, which in turn originally retrieved it from a certificate authority 240 that had previously established a public/private key pair for recipient 300 (as indicated by the dashed line).

While devices 110, 310 are depicted as computers, they are not limited to just computers. In particular, these devices may be any networkable computing devices that can perform cryptologic manipulations including, without limitation, a smartcard, a hardware security module, a smartphone, or a personal digital assistant. Further, it is contemplated that, because a computing device contains sensitive information, an individual wishing to use such a device 110, 310 in accordance with various embodiments of the invention must first authenticate himself or herself to the device using a method known in the art (such as passwords or biometric inputs). Any reference to device 110 in this written description and the accompanying claims should be construed to include all such computing devices, unless context demands otherwise.

Communications from an individual to an IEC are secure. In accordance with various embodiment of the invention, inbound communications are encrypted by the individual using a public encryption key of the IEC. In a preferred embodiment, the public key is retrieved from a cached record stored on the individual's device 110, for example from a smartcard in a smartphone. Initialization of the individual's device for providing the cached record is described in more detail below. Retrieving the public key without accessing a public network prevents a man-in-the-middle attack against an IEC certificate authority. However, in alternate embodiments, the IEC public key may be obtained using a prior art public key infrastructure. Once the IEC receives a message so encrypted, its systems decrypt the message for further processing using an IEC private key according to methods known in the art.

Inbound communications may be further secured by requiring authentication of the identity of the individual to the IEC. Such authentication may be accomplished, for example, in accordance with the systems and processes described in U.S. provisional patent application 61/228,847, entitled "Secure Transactions Using Light Weight Credentials," the contents of which are hereby incorporated by reference in their entirety. In particular, the operator of an IEC may require the establishment of a shared secret, known only to the individual and the operator. In accordance with such embodiments, inbound communications to the IEC include a transaction cipher encrypted by the individual using a shared secret, in addition to any other data. After the incoming message is decrypted, the IEC decrypts the transaction cipher using the shared secret, and compares the decrypted value against a transaction serial number that the IEC calculates independently. If there is a match, then the individual is authenticated, and service request processing continues. If there is not a match, then the service request is not processed, and re-authentication procedures may be employed. Thus, the IEC may request retransmission of the transaction cipher, request that a different IEC public key be used, or request that a re-authentication procedure known in the art be used. Repeated failed attempts to access IEC functionality may be addressed by manual or automatic, temporary or permanent blocking of incoming communications from an individual, or the individual's subnet or CIDR block (as those phrases are known in the art). Such blocking may be used, for example, to curtail a distributed denial of service (DDoS) attack, thereby preserving the availability of the IEC to the Internet, or other relevant network. In addition, repeated failures may be logged and reported to the IEC operator, as described in more detail below.

Outbound communications from the IEC to the individual are also secure. In accordance with various embodiments of the invention, outbound communications are encrypted by the IEC using a matched encryption key of the individual that is not exposed to any public network. As a matched key is functionally equivalent to a prior art public key, the individual may decrypt an outbound communication from the IEC using the individual's private key in accordance with methods known in the art.

As with inbound communications, outbound communications may be further secured by requiring authentication of the recipient to the IEC. Such authentication may be accomplished, for example, in accordance with the systems and processes described in U.S. provisional patent application 61/177,539. In particular, an IEC may rely on its own data regarding the identity of an intended recipient of the outbound communications, and ignore any information provided by a third party to ostensibly identify the recipient, such as a name, an IP address, domain name, or certificate number. In such embodiments, the IEC encrypts outbound communications using a recipient-matched key that it obtains from its own, private authentication network 230. Thus, the IEC avoids the need to obtain the recipient's public key from an external certificate authority, thereby foreclosing a possible man-in-the-middle attack against the recipient's certificate authority.

IEC Functionality

An IEC performs a number of identity services using methods from prior art public key cryptography. An IEC generally exposes its identity services using a data interface protocol. The data interface protocol may be defined in terms of XML, and a user may obtain access to IEC identity services by sending properly formatted XML files to an Internet port exposed by an IEC computer system, although those skilled in the art may see many possible obvious variations of the basic interface design (e.g., using data exchange formats other than XML, or using a local area network or virtual private network instead of the Internet). The data interface protocol allows users to ask questions about the identity of others, and perform encryption and decryption functions. Typically, service requests include such data as the transaction cipher described above; a requested service identifier; data particular to the requested service, such as a message to encrypt or an indication of an identity to authenticate; a certificate serial number as described below; and other such data. A skilled person may be able to see how to extend these fields logically to create other data service request formats that are tailored to a wide variety of identity service applications.

However, an IEC never exposes any encryption keys to entities outside the IEC. Instead, in accordance with one embodiment of the invention, cryptologic data created on behalf of a user 100 are indexed in the IEC by a certificate serial number that is only known to the user. For example, the user 100 may physically appear at a security station, where a certificate authority 240 establishes private and matched keys for the user, and communicates the private key to the user in a digital certificate via a hardware device such as a smartcard or a smartphone 110. To create a certificate serial number for the matched key certificate, a one-way hashing algorithm (such as SHA-1 or other algorithm known in the art) may be applied to the data in the private key certificate. Later, as described more fully below, user 100 requests a particular service using that cryptologic data by communicating the certificate serial number in an encrypted service request, along with other data unique to the user. (The user thus computes the certificate serial number from its own private data, so the certificate number never travels unencrypted over an insecure network in a manner that might tie it to the user.) Once it receives this service request, the IEC uses its data to unlock the certificate having the appropriate encryption data, so the requested cryptologic operation may be performed in accordance with methods known in the art for doing so. However, a Services Cloud 220 performs its processes without manipulating any information that could yield the user's identity, even should an attacker somehow gain access to the Services Cloud. This is accomplished by providing that the unique data is obscured, in the sense that it is not tied to another data record in the Services Cloud 220 that identifies the user. (Such an association may reside in a certificate authority 240, for example.) To further provide privacy to users, the unique data may be provided so that it is only computationally available to a surrogate certificate, as now described.

To further the ability of an IEC to protect its users from a would-be attacker, and to provide additional identity services, an IEC in accordance with embodiments of the invention may use surrogate certificates. A surrogate certificate is a digital certificate that is never exposed outside the IEC, and acts as a proxy, or surrogate, for the user to perform cryptographic manipulations inside the IEC. Surrogate certificates may be implemented, for example, in accordance with the systems and processes described in U.S. provisional patent application 61/228,847, described above. In particular, a surrogate certificate may be embodied as a lightweight certificate, as that phrase is defined in that application, and is identified only by its certificate number. Surrogate certificates provide complete anonymity to cryptographic services inside an IEC.

In accordance with one embodiment of the invention, messages to an IEC may be doubly encrypted. To be more specific, requester 100 first encrypts data using their own private key, then appends the surrogate certificate identifier before encrypting again using the public key of the IEC. Upon receipt of the doubly-encrypted message, the IEC first decrypts the message using its private key to obtain the singly-encrypted data and the surrogate certificate identifier. Once the surrogate certificate has been located (and validated, using a process described in more detail below), its contents are used to decrypt the inner payload to recover the original data. In this way, the original data are exposed only to the surrogate certificate. This feature provides exceptional security, as the surrogate certificate and the data it manipulates may be implemented in secure hardware that is opaque even to the operator of the IEC. In this way, side channel attacks are effectively thwarted.

An attacker wishing to compromise the security of a message to or from an IEC, or between two IEC users, has a difficult challenge. Communications between a user and the IEC may be encrypted using both the user's private key and the IEC public key, which are preferably cached in a secure location, such as a smartcard protected by an identity challenge. Altering the IEC public key would require physical possession of the smartcard, and would be difficult, if not impossible. Even if the IEC public key were somehow altered, so that messages from the user to the IEC could be decrypted and a message for a recipient intercepted, the attacker would not have the user's matched key to decrypt the message. This information can only be obtained from the IEC itself, and not through any publicly-exposed access point. An attacker may instead opt to crack security only on the Services Cloud. Such a system crack would be difficult, as the cracker would have to have physical access to the Services Cloud servers to access any encryption data directly. However, a system cracker who compromises just the Services Cloud servers would have access only to incoming data that identify a certificate serial number and a message to decrypt using that certificate. That certificate does not identify the user to whom it belongs, so the attacker would have no way of knowing whose messages he was reading from the request data alone—that information is stored only in the certificate authorities. Further, in accordance with the transaction serial number embodiment described above, it would be impossible for the attacker to forge an original message, as the user's device also contains a copy of the transaction serial number that must correspond to the number of messages it has sent to the IEC.

Initialization of a system in accordance with one embodiment of the invention is accomplished as follows. Referring again to FIG. 2, a requester 100 has a relationship with an organization that provides a certificate authority 240. For example, requester 100 may be an employee of the organization, and the organization wishes to permit requester 100 remote access to processing cloud 250. In any event, requester 100 appears, preferably in person at a security office of the organization, and presents credentials for visual or automatic inspection. Such credentials may include a driver's license, social security number, credit card, or other identity documents. Requester 100 also provides, in one embodiment, biometric information such as a fingerprint, or another unique authentication challenge response, such as a password. A security officer collects these data and uses them to generate encryption and decryption keys, according to processes known in the art. One key is stored in a digital certificate, as described above, and the other key is stored in a digital format in a requester device, such as a smartcard or a smartphone 110. A certificate serial number may be generated, for example, by applying a one-way hash to the contents of the stored, second key certificate. Such hashes include SHA-1, for example, and are well known in the art. In a preferred embodiment, a public key of the IEC is also provided in the same requester device, so that this key may be later retrieved without resort to a publicly accessible certificate authority. The digital certificate itself is published to the Services Cloud 220, via network 230, where the certificate is securely stored according to methods known in the art. With a system so initialized, requester 100 may use requester device 110 at a later time to present IEC 200 a message, including the certificate serial number, and encrypted using the stored key and the IEC public key. The encryption and decryption keys so generated may be used by the requester and the IEC for communications across an insecure public network, such as the Internet.

Surrogate certificates for use entirely within the IEC may be created at the same time, or they may be created later. A surrogate certificate is created, for example, by an appropriate certificate authority 240 sending a properly formatted message to Services Cloud 220 at the request of an organization. Alternately, this service may be provided by processing cloud 250, to which requester 100 has logged in and made such a request. The key stored in an existing certificate may be copied to the surrogate, or in the alternative, a new certificate containing encryption and/or decryption keys may be generated by certificate authority 240, depending on the intended use of the surrogate. In the latter embodiment, the serial number of the newly generated surrogate certificate is provided to requester 100 using a message encrypted with a previously-established matched key of the requester, or through another secure method. Generating a surrogate certificate identifier proceeds in a similar fashion as generating an ordinary digital certificate. In particular, the use of a one-way hash for generating surrogate certificate serial numbers ensures that no party other than the certificate authority 240 and the requester 100 can connect the surrogate certificate to the individual. Other parties that are unable to make this connection include, e.g., a system cracker, and the operator of IEC Services Cloud 220. Thus, individual agencies who wish to contract for identity services with the operator of IEC Services Cloud 220 may be assured that their own private data is entirely obscure, providing an additional advantage over the prior art.

Private/matched certificates and surrogate certificates may be revoked using methods known in the art for revoking digital certificates. These methods include the use of certificate revocation lists (CRLs) and the online certificate status protocol (OCSP). Unlike prior art techniques, in accordance with various embodiments of the invention, certificate revocations may be performed by an IEC in near real-time through use of OCSP updates on the private network 230. Processes for such real-time revocations is described in U.S. provisional patent application 61/291,018, entitled "Efficient Secure Cloud-Based Processing of Certificate Status Information," the contents of which are hereby incorporated by reference in their entirety. In particular, because private network 230 is dedicated and preferably high-capacity, and because certificate authorities 240 only service requests from Services Cloud 220, the OCSP response should be nearly instantaneous. Further, OCSP requests may include a digital timestamp, and OCSP responses for public keys requested by requester 100 may be digitally signed by the IEC (as well as encrypted). Thus, various embodiments of this invention are an improvement over prior art systems for which OCSP responses may be delayed, and they make possible the ability to obtain secure, near real-time status data for any certificate. As a further security measure, the IEC may transmit to a certificate authority 240 each request for an OCSP update of one of its public keys.

Because the IEC is scalable, such validation may be performed for every transaction. Thus, once a certificate authority updates the status of a certificate to "revoked," the associated individual is immediately prevented from obtaining future identity services through the IEC. The next time the individual requests any identity service from the IEC, the IEC performs an OCSP update, determines that the individual's certificate was revoked, and denies the request. Persons skilled in the art may appreciate other uses for the instantaneous revocation of digital certificates that are within the scope of this invention.

Sensitive data that might be used to associate an individual with a certificate, such as personally identifiable information (PII), is handled specially within an IEC. Such information includes a name, address, social security number, credit card number, telephone number, and other such information. PII is generally stored in an IEC in an encrypted format as follows. Referring to the exemplary embodiment in FIG. 4, an IEC receives 410 a message from the individual (using the data interface protocol described above in connection with FIG. 3). Among the data received in the message are a surrogate certificate identifier and the sensitive data. Next, the IEC locates 420 the surrogate certificate identified by the identifier, either in a local storage arrangement or in the private data network 230. In accordance with this embodiment, the IEC then determines whether the surrogate certificate is still valid by validating 430 it. Validation may be performed using real-time OCSP, as described above. Additionally, the IEC may at this time perform additional validation steps (not shown), such as validating a password or biometric provided in the request message. Once the correct surrogate certificate has been located, the IEC then encrypts 440 the sensitive data using the surrogate certificate encryption data. Due to the operation of surrogate certificates, these encryption data are never in the possession of the requesting individual, or any individual outside the IEC, so only the IEC may decrypt the encrypted sensitive data at a later time.

Next, the encrypted sensitive data are stored 450 in a storage arrangement (such as a storage cloud that is internal or external to the IEC) for later decryption by the IEC. A storage location is determined, and a reference to that location may be sent 460 back to the individual. The individual may later provide that storage handle to another person, allowing the second person to query the sensitive data if the individual has permitted such queries. Alternately, the IEC automatically maintains a database of storage locations that include queriable sensitive data, so the individual need not receive a storage handle.

Notice that even if the Services Cloud 220 is compromised, an attacker cannot decrypt data using any chosen surrogate certificate, because 1) surrogate certificates may only be unlocked using biometric information or other challenge data that is present in a service request; and 2) even if the attacker had a database of challenge data associated with individuals that might be used to unlock a surrogate (however unlikely), there is no information in the Services Cloud itself that ties any given surrogate certificate to an individual, or vice versa. Thus, anonymity and privacy for its members may be assured to any organization that provides a Certificate Authority 240 to the IEC.

Figures 4, 4A:
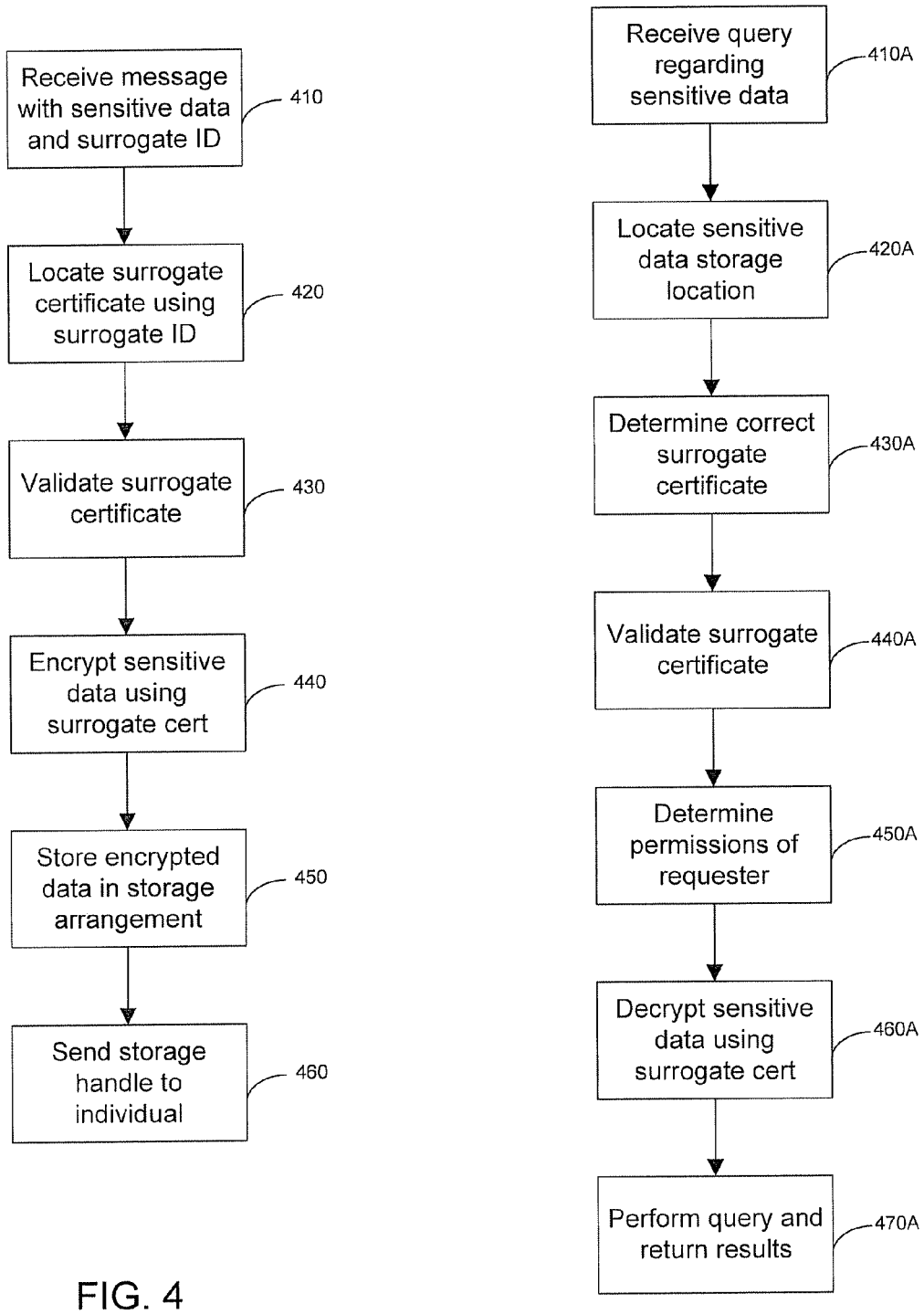
FIG. 4 is a flowchart that illustrates a method for securing sensitive data, such as personally identifiable information, within an Identity Ecosystem Cloud.

FIG. 4A shows the process for querying sensitive data stored as in FIG. 4. First, the IEC receives 410A a query regarding sensitive data. In response, the IEC locates 420A the sensitive data in the storage arrangement. This location may be provided using a storage handle, or alternately it may be maintained automatically by the IEC. In either case, the IEC determines 430A which surrogate certificate may be used to decrypt this sensitive data. Such determination may be performed because the surrogate certificate serial number itself is provided in the service request. Alternately, the IEC may maintain a database matching storage locations to surrogate certificates. Note that such a database contains no information that can tie an individual to a surrogate certificate. As before, the IEC validates 440A the surrogate certificate, and prevents the transaction from completing if the surrogate certificate is no longer valid. Next, the IEC determines 450A whether the requester has permission to decrypt the sensitive data. Such permission may be practically accomplished in any of a number of methods known in the prior art, including placing a digital certificate of the requester in the trust chain of the surrogate, or by looking up decryption permissions in a database. If permission to query has been granted, the IEC decrypts 460A the sensitive data using the surrogate. Finally, the IEC performs 470A the query and returns the results to the requester.

Various modifications may be made to this process. In some embodiments, an individual gives different permissions to different requesters. Thus, for example, a liquor store merchant should have the ability to query an individual's age, but not their address or credit card numbers. Similarly, a traffic officer may be permitted to query the individual's driver license number, but not their social security number. Such selective queries are enabled by encrypting each piece of sensitive data using separate surrogate certificates for an individual. In this embodiment, each surrogate has its own trust chain, and various requesters each have their own digital certificates that the individual (or the IEC) places in that trust chain or permissions database. Thus, a law enforcement officer may query the individual's sensitive data knowing only its location in the storage arrangement. In some embodiments, the IEC may itself keep track of which storage locations may be decrypted by any given surrogate certificate, simplifying the process. In additional embodiments, the decrypted sensitive data may be re-encrypted using a public key of the requester before it leaves its secure hardware.

An IEC may also maintain, using techniques known in the art, a detailed log of all of the above operations and transactions. Such a log or logs may be useful, for example, to allow an individual to determine who has requested access to her sensitive data, or to perform an audit. Such logs may also be used to demonstrate compliance with various medical privacy laws such as HIPAA and HITECH, or any other laws that require detailed recordkeeping. The transaction log or portions thereof may be digitally signed by the IEC itself, and each entry may be signed using the surrogate certificate that participates in the transaction, providing tamper protection.

Exemplary IEC Modes of Operation

In accordance with various embodiments of the invention that use surrogate certificates, identity services may be performed only after unlocking the surrogates. Unlocking a surrogate certificate may be a many-stepped process. As already described, the IEC may receive an encrypted message from an individual seeking identity services. If the message encryption cannot be decrypted, then the surrogate is not unlocked. If the message is decrypted, but the IEC has required transaction numbers in accordance with U.S. provisional patent application No. 61/228,847, described above, and if the transaction number data received from the individual is incorrect, then the surrogate is not unlocked. If the transaction numbers match, but the service request message does not include a valid surrogate certificate ID number, then the surrogate is not unlocked. If the message includes a valid ID number, the IEC attempts to validate the surrogate using its source Certificate Authority, and if the surrogate is no longer valid, then it is not unlocked. If the surrogate is valid, but the biometric or other identity challenge in the request message fails the proper cryptographic challenge, then the surrogate is not unlocked. And if the request is being made for a surrogate of someone other than the individual making the request, the surrogate will not be unlocked unless the requester is in the trust chain of the surrogate certificate. One may be assured that, in accordance with various embodiments of the invention, surrogate certificates are only unlocked to perform cryptographic manipulations after passing the most rigorous of security challenges.

Figure 5:
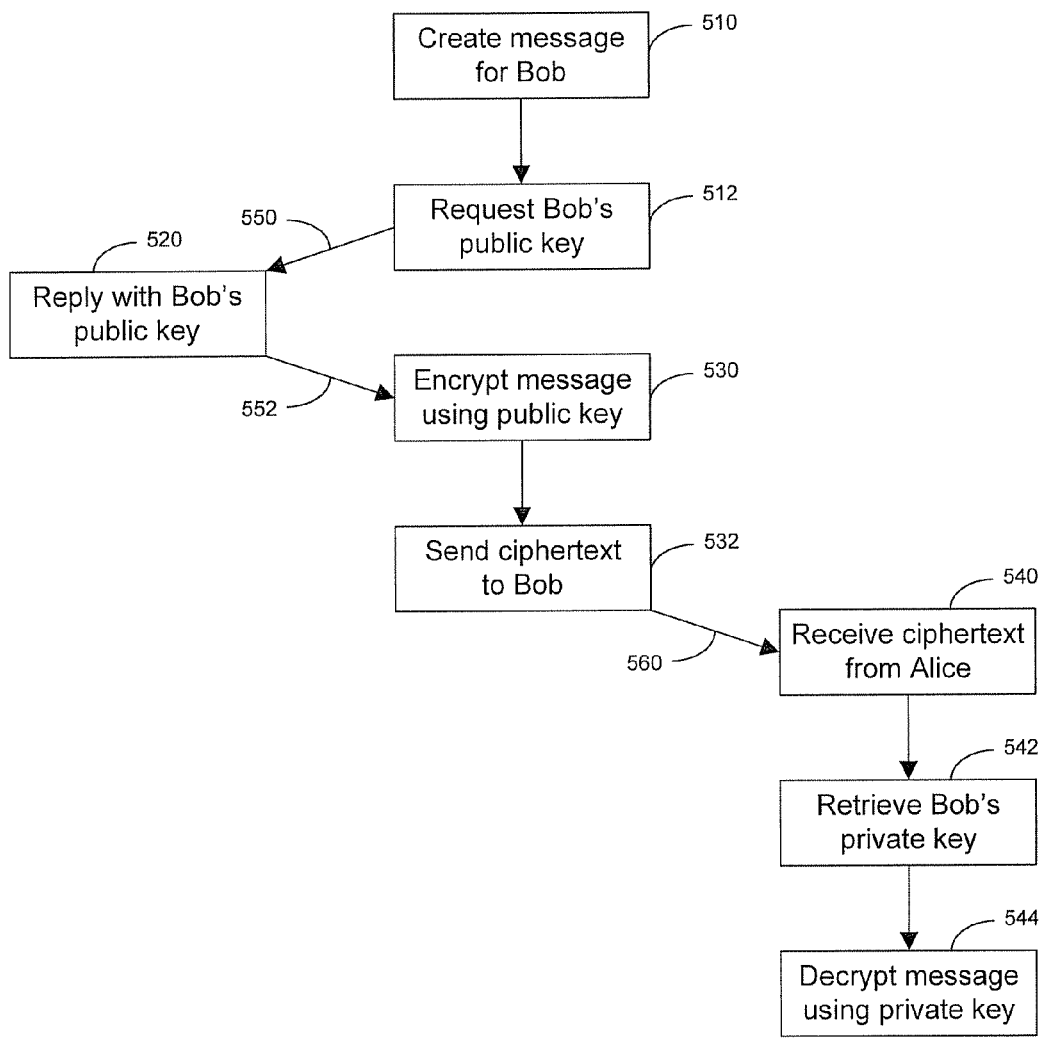
FIG. 5 is a flowchart that illustrates a prior art method for transmitting an encrypted message from a sender to a recipient.

A requester 100 may use an IEC to perform, in a novel manner, any method for providing identity services that is known in the prior art and that requires the use of a public key infrastructure (PKI) for obtaining a public key. One such prior art method is the sending of an encrypted message from a sender ("Alice") to a recipient ("Bob"), and is illustrated in FIG. 5. In accordance with this prior art technique, a certificate authority provides to the public a collection of public encryption keys, including Bob's key. First, Alice creates 510 a digital message for Bob. Next, Alice requests 512 Bob's public key from the certificate authority, typically over a public network such as the Internet and using an unencrypted message. The certificate authority replies 520 with Bob's public key. Using this public key, Alice encrypts 530 the message according to any of a variety of methods known in the art (and especially known to and agreed upon by both Alice and Bob). Alice sends 532 the encrypted ciphertext to Bob, again using a public network such as the Internet. Bob receives 540 the ciphertext from Alice. Next, Bob retrieves 542 Bob's own private key from a secure location, such as a smartcard or smartphone. Using Bob's private key, Bob decrypts 544 the ciphertext to retrieve the plaintext message.

Because this system uses a prior art PKI that must be accessed via a widely-accessible network, the request 550 and receipt 552 of information pertaining to Bob's public key is vulnerable. For example, a malicious attacker ("Mallory") may perform a so-called man-in-the-middle attack as follows. First, Mallory interposes herself in the network between Alice and the certificate authority and intercepts request 550, preventing the certificate authority from ever receiving it. Then, Mallory forges a properly formatted reply 552', substituting her own public key for that of Bob. Alice, completely unaware of the subterfuge, proceeds to encrypt her message for Bob using the wrong public key, and transmits it. Mallory intercepts the second message 560, preventing Bob from receiving it. Mallory then decrypts the ciphertext using her own private key, thereby gaining access to the plaintext meant only for Bob. Bob is left completely unaware that a message was ever sent to him. If desired, Mallory may even forge a digital receipt from "Bob" that satisfies Alice of the receipt of her message by Bob. Such attacks may be performed if Mallory has access to a network uplink through which all data must flow, which is a common occurrence in a corporate environment. These attacks can be very difficult to detect, and can compromise confidential information on an ongoing basis.

Figure 6:
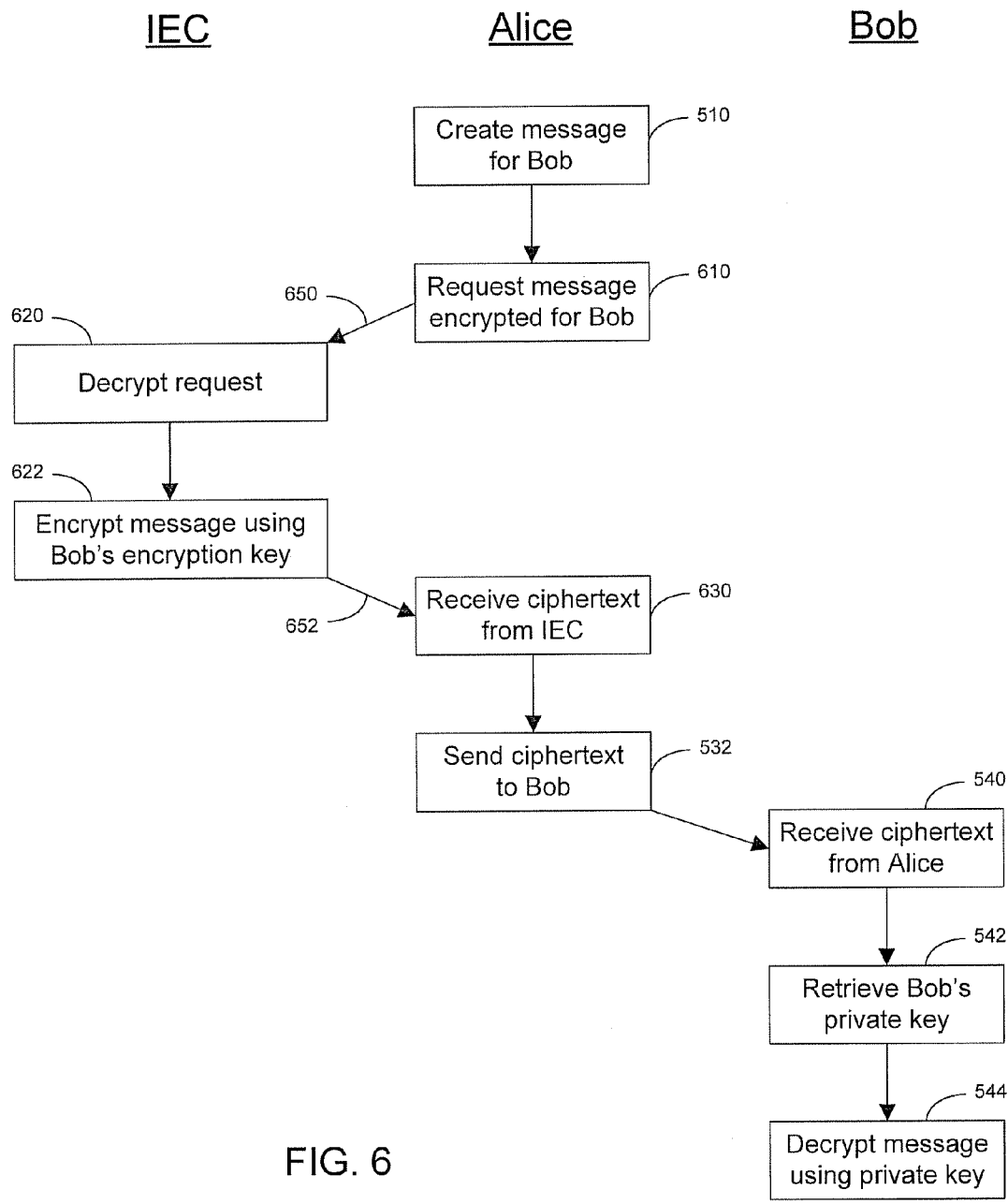
FIG. 6 is a flowchart that illustrates a method for transmitting an encrypted message from a sender to a recipient in accordance with an embodiment of the invention.

FIG. 6 shows a process for sending a message in accordance with an embodiment of the present invention that avoids man-in-the-middle attacks. Most of the steps are the same as in FIG. 5, but the IEC performs, by different means, the identity functions of the certificate authority in the prior art. Referring to FIG. 6, Alice creates 610 a message for Bob, as before. However, instead of sending a request 650 for Bob's public key across the insecure Internet, Alice instead formats an identity service request according to the IEC data format, as described above. In this request, Alice provides her surrogate certificate serial number (computed from her private information only), an optional transaction serial number (if required), any challenge data required by the IEC such as a biometric or password, the message for encryption itself, and data indicating that the message is to be encrypted for transmission to Bob. Alice encrypts this data request using the IEC public key. Alice then transmits 610 this encrypted request to the IEC.

The IEC receives and decrypts 620 the request using an IEC private (matched) key. The IEC optionally performs additional authentication of Alice as described above. The IEC processes the request, for example by parsing its XML according to methods known in the art. In this case, the request is for a message payload to be encrypted for transmission to Bob, so the IEC retrieves Bob's public encryption key, and encrypts 622 the message using this key. The IEC then returns the ciphertext to Alice over the Internet or other public network, where it is received 630. Now that Alice has the (already encrypted) ciphertext, she simply transmits 632 it to Bob, and the remainder of the steps are the same. In an alternate embodiment, Alice may believe that someone other than Bob (e.g., his friend) is decrypting her messages using Bob's private key. In this case, she may request that the IEC encrypt 622 the message using Bob's matched key instead of the key used for communicating over the Internet. In this case, Bob (or Mallory) would not be able to directly decrypt the message received 540 from Alice, as it was not encrypted using a key in Bob's possession. Instead, Bob would be required to independently access the IEC, unlock his own surrogate certificate, and use his surrogate certificate's matched key to decrypt the message. (In order to unlock the surrogate, the requester would have to meet a separate biometric or identity challenge that only Bob can meet, thereby assuring Alice that only Bob is reading her messages.) The IEC would then re-encrypt the plaintext message using Bob's public key for transmission to the requester (who has now been independently authenticated as Bob).

These embodiments are advantageous over the prior art for several reasons. First, Bob's matched key is never exposed on a public network, so it cannot be compromised by an interloper interposed between Alice and the IEC. Second, all traffic on the public networks is encrypted. While Mallory may still intercept request 650, she cannot decrypt it because it has been encrypted with the public key of the IEC. Thus, Mallory cannot discern the purpose of the request (namely, that it is to encrypt a message for Bob), and thus cannot forge an appropriate response 652'. Third, unlike normal certificate authorities, an IEC can scale indefinitely, making it resistant to denial of service attacks, providing the ability to service a great deal of requests with high availability. Those skilled in the art may appreciate other advantages of these embodiments.

Figure 7:
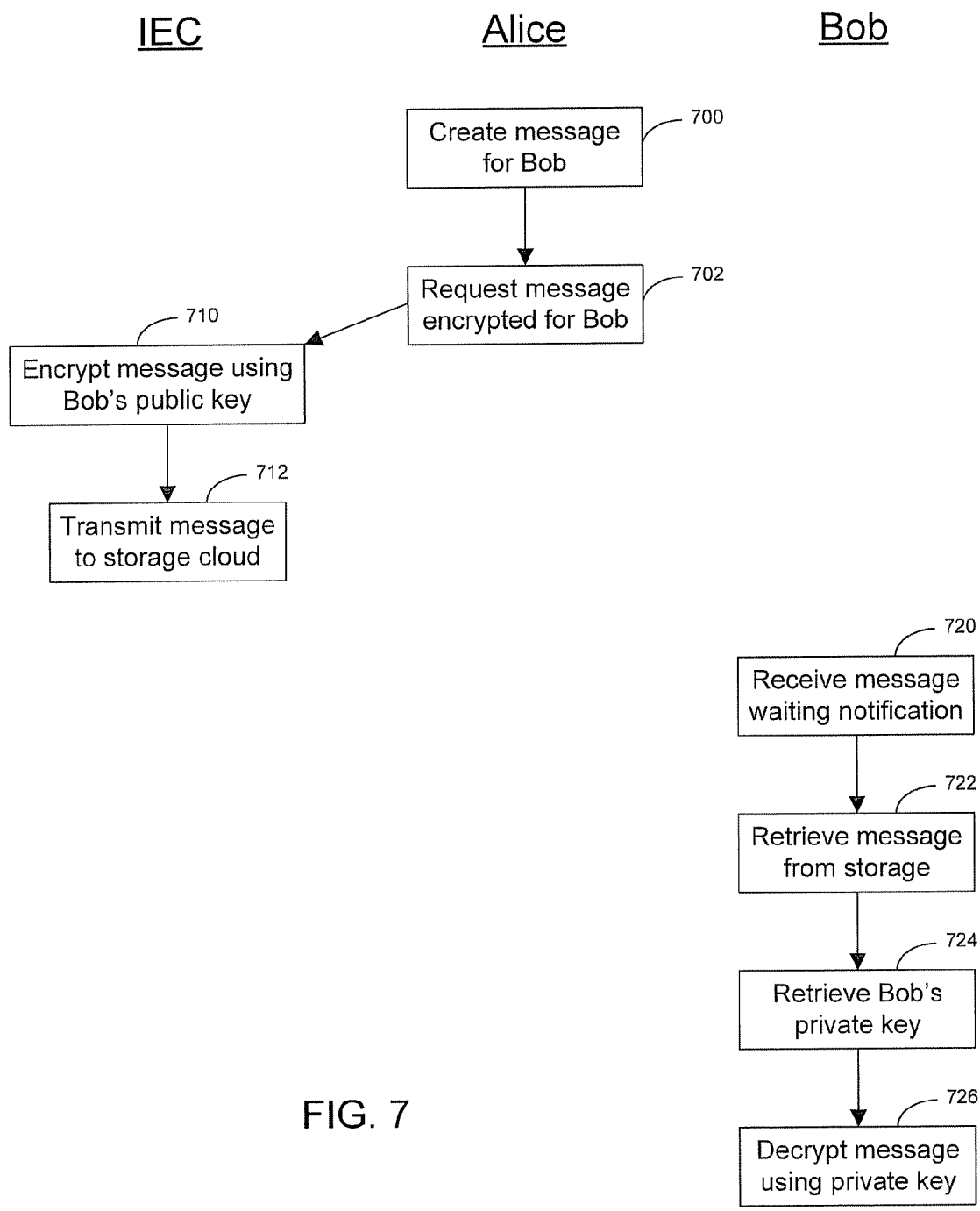
FIG. 7 is a flowchart that illustrates a method for transmitting a delayed encrypted message from a sender to a single recipient in accordance with an embodiment of the invention.

FIG. 7 is a variation on the theme of FIG. 6, in which an encrypted message is stored in a storage cloud for later retrieval by Bob, without requiring immediate delivery by Alice. The process begins similarly to FIG. 6; thus Alice creates 700 a message for Bob, and requests 702 that the IEC encrypt the message for delivery for Bob (in this case, using the storage cloud). The IEC encrypts 710 the message using Bob's public (or matched) key, and transmits 712 the encrypted message to the storage cloud. Because the message can only be decrypted by Bob using his private key (or a matched key), transmission 712 may be performed over an insecure or widely-available network, including the Internet or a corporate LAN. The storage network (or the IEC) notifies Bob that it has received the message (not shown), but in any event Bob receives 720 a "message waiting" notification at some later time. This notification includes, for example, a directory path, URL, or other data that identify a location in the storage cloud from which the message may be retrieved. Bob uses this data to retrieve 722 the message from the storage cloud. This message is encrypted, so Bob then retrieves 724 Bob's own private key from secure, local storage, and uses it to decrypt 726 the retrieved message.

Figure 8:
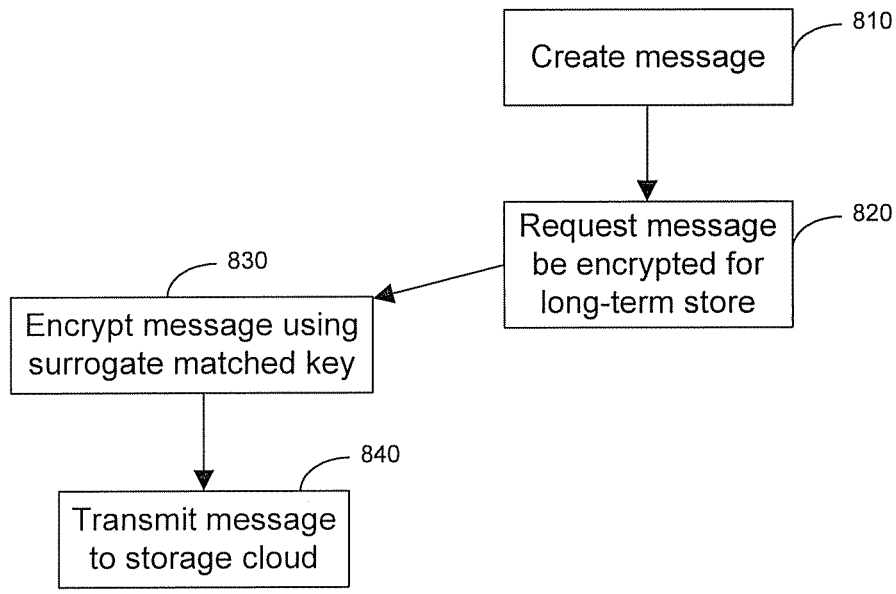
FIG. 8 is a flowchart that illustrates a method for transmitting a delayed encrypted message from a sender to multiple recipients in accordance with another embodiment of the invention.

FIG. 8 shows yet another variation on the message-exchange theme, in which Alice wishes to transmit a message to one or more recipients whose identities are not known at the time the message is sent. In this embodiment, Alice cannot instruct the IEC to encrypt the message directly for transmission to a recipient (e.g., Carl) because Carl's identity is unknown. Thus, Alice directs the IEC to encrypt the message using her own surrogate certificate, so that she (and only she) may later unlock the message for re-encryption at a later time once the recipients are known. Referring to FIG. 8A, Alice creates 810 a message, and transmits 820 the message to the IEC with a request to store it using her own surrogate. The IEC then encrypts 830 the message using Alice's own matched key, and transmits 840 it to a storage cloud for long-term storage.

Once Alice determines Carl's identity, the processes after the break may commence. Alice requests 850 that the previously encrypted message is sent to Carl. The IEC first challenges 860 Alice to unlock her surrogate certificate, as described in detail above. Alice responds 862 to the identity challenge, and the IEC decrypts 870 the message (which it has fetched from the storage cloud) using Alice's surrogate private key. Now that the message plaintext is available, as in FIG. 7 the IEC (by way of Alice's surrogate certificate) encrypts 880 the message using Carl's public (or matched) key and transmits 890 it back to the storage cloud for later retrieval by Carl.

As can be plainly seen by this discussion, embodiments of the invention enable a person having skill in the art to make and use a great number of variations on the sending of messages between two parties. Because an IEC may be expanded in a scalable fashion to employ vetted modules that provide additional identity services functionality, it should be readily apparent that the same depth and diversity of functionality may be applied to these other services, which formerly required public key infrastructures. An IEC may be used to provide identity validation services, such as verifying the status of a traditional public key certificate that is presented to it and verifying non-certificate identities. An IEC may be used to store certain cryptographic secrets, such as private keys, in escrow to provide simple and secure recovery of data should a user's hardware device 110 be lost or stolen. An IEC may also provide trust paths between certificates, cross-validation between certificates, and enforce security policies based on issued certificates. An IEC may act as a certificate store, storing vetted public keys while prohibiting dynamic update of those keys. Any process that requires a public key can request it from the store, provided the process is also authenticated. For brevity, the vast number of figures and lengthy descriptions required to explain each of these processes in detail is omitted, but it should be understood by a person skilled in the art that these other processes may be implemented with as much diversity and depth as shown in FIGS. 6-8.

Many variations on the use of surrogate certificates within an IEC are contemplated. For example, an IEC may support recursive surrogates—surrogate certificates whose encryption keys unlock other surrogate certificates. Recursive surrogates may be created and initialized in the same manner as ordinary surrogates, so that they provide another level of indirection between an associated individual and the ultimate encryption data used to perform cryptographic operations.

Figure 9:
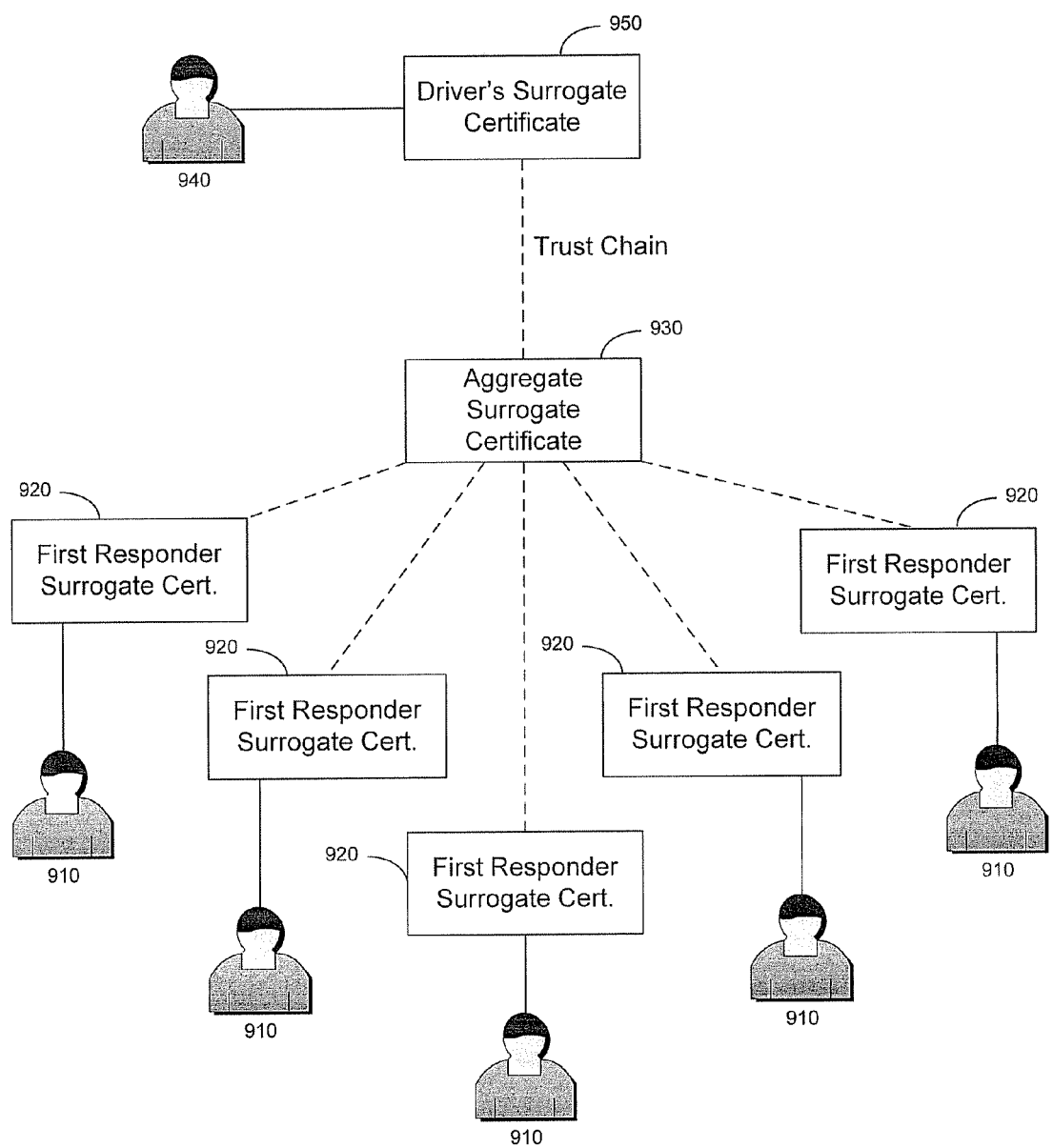
FIG. 9 shows the relationships between surrogate certificates in an exemplary embodiment of aggregate certificates.

As an example of the usefulness of recursive surrogates, a surrogate certificate may act as a proxy for the credentials of not only a single individual, but many individuals. The permissions of such aggregate surrogates may be created using recursive surrogates. The relationship between the aggregate surrogate and individual surrogates is illustrated in the exemplary embodiment of FIG. 9. In this Figure, a police department has a single surrogate certificate that provides all of its first responders access to safety information, such as driver license data. To be more specific, each individual first responder 910 in the department establishes a surrogate certificate 920 in the ordinary course of the hiring or promotion process. Next, an aggregate surrogate certificate 930 is formed for the department as a whole, and each surrogate 920 in the collection of first responder surrogates is placed in the trust chain of the aggregate surrogate certificate (as represented by the dashed lines). In this situation, each individual first responder 910 has permission to use the aggregate's encryption data to, e.g. unlock driver license information of individual 940 that has been sealed using that individual's own surrogate certificate 950. This may be accomplished in practice by placing aggregate surrogate certificate 930 in the trust chain of surrogate certificate 950, or by maintaining within the IEC a listing of all surrogate certificates (such as aggregate certificate 930) that have permission to unlock particular data contained within all surrogate certificates. Note that the use of a particular first responder surrogate certificate 920 to unlock aggregate certificate 930 may itself be logged in the transaction log described above, thereby permitting a partial audit trail of access to the personal data of individual 940 to be reconstructed. By combining such logs, a complete and digitally signed audit trail may be reconstructed, and in one embodiment the individual 940 may herself access this audit trail as an identity service provided by the IEC.

Another embodiment of the invention permits the secret encryption keys or other data stored in a surrogate to shared using secret sharing, as that term is defined above. In one implementation, the certificate serial number of the surrogate certificate is the shared secret. The surrogate certificate is created and assigned a serial number, and a secret sharing algorithm (such as the (n,t)-threshold algorithm described above) is used to create partial secrets. These partial secrets are then stored in other surrogates that are associated with individuals who may have access to the shared secret. A vetted identity services module in the IEC then processes requests from these individuals to unlock the surrogate certificate, thereby permitting access to its encryption keys. Note that the actual shared secret is never revealed to any of the parties outside the IEC.

To provide another illustration, a lender may use an IEC to securely provide credit to individuals while avoiding identity theft. In traditional systems, a credit card may be stolen and used by an unauthorized user several times before the fraud is discovered. Even then there may be pending transactions that will lead to further charge backs that are expensive for the lender to process. However, in accordance with another embodiment of the invention, a lender uses the built-in certificate revocation mechanism in the IEC to instantly revoke credit associated with an individual. In this embodiment the individual's credit balance is encrypted using a surrogate certificate created for that individual by the lender, as part of the lender's process of establishing credit. The lender secures access to this surrogate certificate using biometric information or passwords of the individual, as explained above, according to the lender's own business practices and security requirements. If and when identity fraud is suspected, the lender simply instructs its own certificate authority to revoke the individual's surrogate certificate. This revocation is then transmitted in near-real time to the IEC according to the processes described above, thereby instantly preventing further fraudulent transactions that can affect the balance. If fraud is ultimately found not to have occurred, the encryption keys of the revoked certificate can be reinstated in a new surrogate certificate by retrieving them from secure storage. This embodiment of the invention allows financial transactions to occur without authenticating to the lender's own certificate authority each time, but the use of surrogate certificates provides an equivalent amount of security. Thus, lenders using the IEC obtain increased security over prior art systems without incurring a corresponding increase in their transaction costs.

As can be seen, an individual may have multiple surrogate certificates associated with their identity in the IEC, each useful for a different purpose. For example, an individual may have a surrogate for each credit lender, as well as a surrogate that controls access to their driver license information, their bank account information, or any other information. The use of multiple surrogate certificates in an IEC provides several security advantages. First, traffic analysis of individual transactions becomes much harder, as different certificates are used for each type of transaction. Second, if a surrogate certificate is compromised, the other surrogate certificates for the associated individual may not be affected, resulting in only minor inconvenience to the individual. Third, trust chains for each surrogate may differ, so that each type of transaction may have a different list of users that are authorized to unlock the surrogate certificate. Thus, a surrogate used to protect medical information may include emergency first responders in its trust chain, but not liquor store owners. Conversely, a surrogate used to protect driver license information may allow liquor store owners to unlock it, but not emergency medical technicians. A person skilled in the security arts may see other uses for multiple surrogate certificates that fall within the scope of the invention.

The embodiments of the invention described above are intended to be merely exemplary; numerous variations and modifications will be readily apparent to those skilled in the art. All such variations and modifications are intended to be within the scope of the present invention as defined in any appended claims, unless expressly disclaimed.

What is claimed is:

1. A computerized method of providing a cryptographic identity service to an individual, the method comprising:
   receiving from the individual over a network, at a server system, an electronic message containing a request for the cryptographic identity service, the request including a surrogate certificate identifier specific to the individual, the surrogate certificate identifier identifying a specific surrogate certificate having encryption data, the surrogate certificate identifier having been constructed by applying a one-way hash function to data, accessible only by the individual, that is associated with the specific surrogate certificate;
   retrieving the specific surrogate certificate, from a storage arrangement that is part of the server system, using the received surrogate certificate identifier specific to the individual, wherein the storage arrangement stores, without retrievabilty thereof by any user, a set of surrogate certificates that are indexed by surrogate certificate identifiers; and
   performing the requested identity service in a computer process using the encryption data in the retrieved surrogate certificate, wherein the server system is configured to preclude performing any identity service unless pursuant to a request including a surrogate certificate identifier pertinent thereto.

2. The method of claim 1, wherein the cryptographic identity service includes one or more services from the group consisting of: identity data validation; identity data backup; identity data recovery; determining the revocation status of a digital certificate; validating a trust path of a digital certificate; cross-validating a digital certificate; encrypting or decrypting data for a recipient using a surrogate certificate; storing, updating, or querying an individual's personally identifiable information; and storing or retrieving a public key.

3. The method of claim 1, wherein the data are stored in a device that is configured to be operated only by the individual after the individual is authenticated to the device.

4. The method of claim 1, wherein the surrogate certificate and the request both include challenge data pertaining to a biometric of the individual, a password known only to the individual, or data contained in a cryptographic token possessed by the individual, the method further comprising:
   performing the requested identity service only when the challenge data in the request matches the challenge data in the surrogate certificate.

5. The method of claim 1, wherein the encryption data are created on behalf of the individual by a computer system, operated by a certificate authority, that is not accessible by the individual.

6. The method of claim 5, further comprising receiving a message revoking the surrogate certificate of the individual, from the certificate authority, thereby preventing the individual from further obtaining identity services.

7. The method of claim 1, wherein performing the requested identity service includes using the encryption data in the surrogate certificate to decrypt personally identifiable information of a second individual.

8. The method of claim 7, wherein the surrogate certificate is prevented from decrypting the personally identifiable information unless the second individual had previously granted permission for said decrypting to a class of people that includes the individual.

9. The method of claim 7, further comprising transmitting to the individual the personally identifiable information of the second individual.

10. The method of claim 7, further comprising transmitting to the individual the answer to a yes-or-no question pertaining to the personally identifiable information of the second individual, without revealing said personally identifiable information.

11. The method of claim 1, further comprising:
   digitally signing information pertaining to the request; and
   appending the digitally signed information to a transaction log.

12. A computing system for providing a plurality of cryptographic identity services on behalf of a relying system, the system comprising:
   a storage arrangement that stores surrogate certificates that are indexed by surrogate certificate identifiers, each such surrogate certificate identifier being specific to an individual that is associated with its respective surrogate certificate, each such surrogate certificate identifier identifying a specific surrogate certificate having encryption data, and each such surrogate certificate identifier having been constructed by applying a one-way hash function to data accessible only by the individual that is associated with its respective surrogate certificate, the surrogate certificates being stored in the storage arrangement without retrievabilty thereof by any user of the computing system; and
   a distributed computing environment, coupled to the storage arrangement and coupled to a public data communication network, the distributed computing environment including a plurality of computing devices configured to cooperatively perform the plurality of cryptographic identity services using the stored surrogate certificates, wherein the computing devices are further configured to preclude performing any identity service unless pursuant to a request, received via the public data communication network, that includes a surrogate certificate identifier pertinent thereto.

13. The computing system of claim 12, further comprising:
an inbound computer gateway in communication with the distributed computing environment via a private data communication network, the inbound computer gateway being configured to
   (i) intercept requests, made by an individual to the relying system, whose execution requires one or more of the plurality of cryptographic identity services to be performed, and
   (ii) challenge the identity of the individual using information stored in a surrogate certificate associated with the individual,
whereby the individual is prevented from accessing the relying system unless the identity challenge is successfully met.

14. The computing system of claim 13, further comprising:
an outbound computer gateway in communication with the distributed computing environment via a private data communication network, the outbound computer gateway being configured to
   (i) intercept a message sent on behalf of the relying system to a recipient before it is delivered to the recipient,
   (ii) retrieve a matched key of the recipient from the storage arrangement,
   (iii) encrypt the message using the matched key, and
   (iv) transmit the encrypted message to the recipient instead of the intercepted message.

15. The computing system of claim 12, further comprising:
an outbound computer gateway in communication with the distributed computing environment via a private data communication network, the outbound computer gateway being configured to
   (i) intercept a message sent on behalf of the relying system to a recipient before it is delivered to the recipient,
   (ii) retrieve a matched key of the recipient from the storage arrangement,
   (iii) encrypt the message using the matched key, and
   (iv) transmit the encrypted message to the recipient instead of the intercepted message.

16. The computing system of claim 12, further comprising a certificate authority, coupled to the storage arrangement, the certificate authority being configured to generate surrogate certificates and store them in the storage arrangement.

* * * * *